United States Patent [19]

Ono

[11] Patent Number: 5,440,266

[45] Date of Patent: Aug. 8, 1995

[54] DEMODULATING APPARATUS HAVING QUICK PULL-IN SYNCHRONIZATION FACILITY AT INSTANTANEOUS DISCONNECTION OF INPUT SIGNAL

[75] Inventor: Mitsuhiro Ono, Kawasaki, Japan

[73] Assignee: Fujitsu Limited, Kawasaki, Japan

[21] Appl. No.: 187,698

[22] Filed: Jan. 27, 1994

[30] Foreign Application Priority Data

May 6, 1993 [JP] Japan ................................. 5-105595

[51] Int. Cl.⁶ ............................................. H03D 3/00
[52] U.S. Cl. ...................................... 329/307; 331/4;
375/327; 329/309
[58] Field of Search .................... 331/4; 329/307, 308,
329/309, 325; 375/81, 83, 120

[56] References Cited

U.S. PATENT DOCUMENTS 4,525,676  6/1985  Atobe et al. ............................ 329/50
4,542,347  9/1985  Verfaillie et al. ..................... 329/124
4,764,730  8/1988  Miyo et al. ............................ 329/50

Primary Examiner—Robert J. Pascal
Assistant Examiner—David Vu

[57] ABSTRACT

A demodulating apparatus, which includes an up/down counter which counts up and down in accordance with a phase detection signal from a phase detector, an addition/subtraction unit which adds and subtracts the value ($\Delta F1$, $\Delta F2$) of the synchronization pull-in range to the count output, a counter stoppage unit which monitors a recovered carrier synchronization detection signal INIT and freezes the count output of the up/down counter immediately when detecting a disconnection of the input signal, and a synchronization pull-in range setting unit which expands the synchronization pull-in range at the same time as this to make it $\Delta F2$. The time required until establishment of synchronization with the input signal next to be received after the disconnection of an input signal is shortened.

9 Claims, 15 Drawing Sheets

Fig.5A TRACK MODE

Fig.5B SWEEP MODE

Fig.5C HIGH-SPEED PULL-IN MODE

Fig.12A
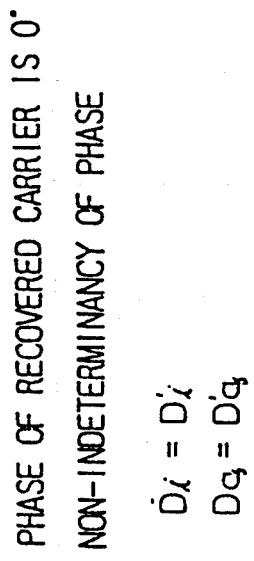
Fig.12B
PHASE OF RECOVERED CARRIER IS 0°
NON-INDETERMINANCY OF PHASE
$\begin{cases} D'_i = A \\ D'_q = B \end{cases}$ $\begin{aligned} D'_i &= D_i \\ D'_q &= D_q \end{aligned}$
Fig.12C
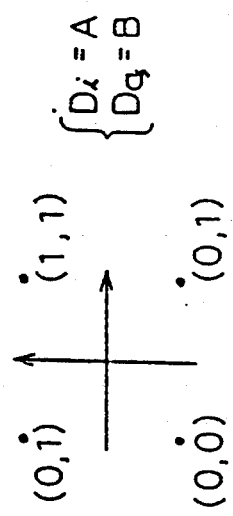
Fig.12D
PHASE OF RECOVERED CARRIER IS 90°
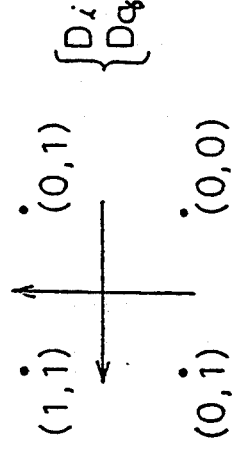
INDETERMINANCY OF PHASE
$\begin{cases} D'_i = B \\ D'_q = \overline{A} \end{cases}$ Fig.12E
(0,1) • • (0,0)
(1,1) • • (0,1)
Fig.12F
PHASE OF RECOVERED CARRIER IS 180°
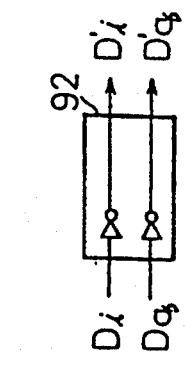
$\begin{cases} D'_i = \overline{A} \\ D'_q = \overline{B} \end{cases}$
INDETERMINANCY OF PHASE
Fig.12G
(0,0) • • (0,1)
(0,0) • • (1,1)
Fig.12H
PHASE OF RECOVERED CARRIER IS 270°
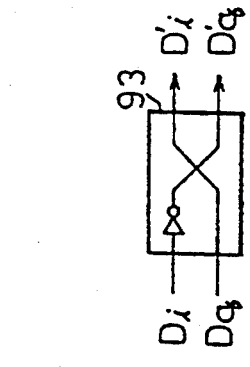
$\begin{cases} D'_i = \overline{B} \\ D'_q = A \end{cases}$
INDETERMINANCY OF PHASE

DEMODULATING APPARATUS HAVING QUICK PULL-IN SYNCHRONIZATION FACILITY AT INSTANTANEOUS DISCONNECTION OF INPUT SIGNAL

BACKGROUND OF THE INVENTION

1. Field of the Invention

The present invention relates to a demodulating apparatus which receives as an input signal a digital phase modulated wave sent from a transmitter side and demodulates this to obtain reproduced data.

Data transmission systems based on digital phase modulation are made much use of in fields such as radio communication and satellite communication. Among the currently used data transmission systems, there are the binary phase shift keying system (BPSK) and the quadrature phase shift keying system (QPSK). The demodulating apparatuses of these are comprised of a plurality of functional blocks. The present invention relates to the functional block for carrier recovery. This carrier recovery functional block had to establish phase synchronization rapidly between the carrier of the input signal and the recovered carrier.

2. Description of the Related Art

As will be explained later in detail referring to the drawings, when using a conventional demodulating apparatus, when there was an instantaneous disconnection of the input signal, it became impossible to achieve quick pull-in of synchronization for the next arriving input signal.

For example, assume a first ground station (A) suspends communication with a second ground station (B) so as to start communication with a third ground station (C). At this time, the first ground station (A) temporarily enters a non-input signal state. When this happens, the later-mentioned up/down counter in the first ground station (A) receives a sweep signal from the sweep/track signal output unit (mentioned later) and immediately enters an up-count (or down-count) operation in one direction. That is, it enters the sweep mode. In this case, if the input signal from the third ground station (C) next starting the communication is received directly after the above-mentioned input signals are disconnected, there is a possibility that the track mode can be returned to once again, but when the input signal is received a while after the input signal is disconnected, the sweep in the sweep mode is considerably advanced and the signal is out of the synchronization pull-in range of the track mode. This being the case, since the pull-in of synchronization is started under the sweep mode anew, at the maximum, one cycle of the sweep passes (that is, the up/down counter ends one cycle's worth of the count in one direction). During that time, communication between the first ground station (A) and the third ground station (C) cannot be started until synchronization is established.

In the final analysis, there is the problem that several seconds are taken at each ground station after the input signal from a certain other ground station is disconnected until the input signal from still another ground station can start to be normally received. The time of these several seconds itself is short, but a blank of several seconds occurring in the middle of for example communication for a television conference would prolong the conference and significantly reduce the quality of the communication service.

SUMMARY OF THE INVENTION

Therefore, the present invention, in consideration of the above-mentioned problem, has as its object the provision of a demodulating apparatus which can perform pull-in of synchronization quickly for an input signal arriving after an instantaneous disconnection of an input signal.

To attain the above object, the present invention is comprised by an up/down counter (mentioned later) which counts up and down in accordance with a phase detection signal from a phase detector (mentioned later), an addition/subtraction unit (mentioned later) which adds and subtracts a value ($\Delta F1$, $\Delta F2$) of the synchronization pull-in range to the count output, a counter stoppage unit (mentioned later) which monitors a recovered carrier synchronization detection signal INIT and freezes the count output of the up/down counter immediately when detecting a disconnection of the input signal, and a synchronization pull-in range setting unit (mentioned later) which expands the synchronization pull-in range at the same time as this to make it $\Delta F2$.

BRIEF DESCRIPTION OF THE DRAWINGS

The above object and feature of the present invention will be more apparent from the following description of the preferred embodiments with reference to the accompanying drawings, wherein:

FIGS. 12A–H are views showing the modes of phase indeterminacy;

DESCRIPTION OF THE PREFERRED EMBODIMENTS

Before describing the embodiments of the present invention, the related art and the problems therein will be first described with reference to the related figures.

Figure 1:
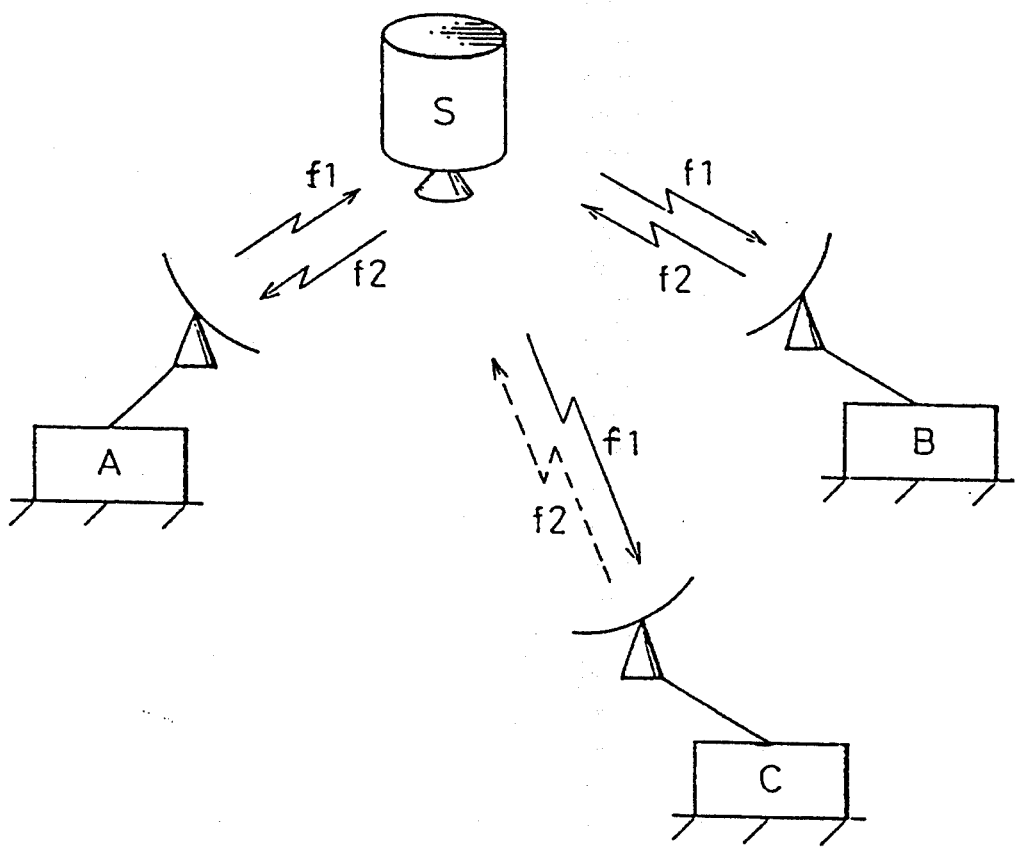
FIG. 1 is a view of a known satellite communication system of one example of the application of the present invention.

FIG. 1 is a view of a known satellite communication system of one example of the application of the present invention. In the figure, A, B, and C are ground stations (for simplification, only three stations are shown), which communicate among each other through a communication satellite S.

Assume now that the ground station A and the ground station B are communicating by an up-converted or down-converted frequency f1 and frequency f2 (however, the frequency f1 can also be received by the ground station C). Here, assume that the ground station A wishes to start communicating with the ground station C instead of the ground station B. This being the case, first, the ground station A disconnects its communication with the ground station B and tries to establish a link with the ground station C. At this time, the previous frequency f2 becomes disconnected and the frequency f2 from the ground station C is newly awaited. At this time, since the previous frequency f2 and the new frequency 2 differ in transmission sources, when starting communication, it is necessary to establish synchronization between the two stations once again.

Figure 2:
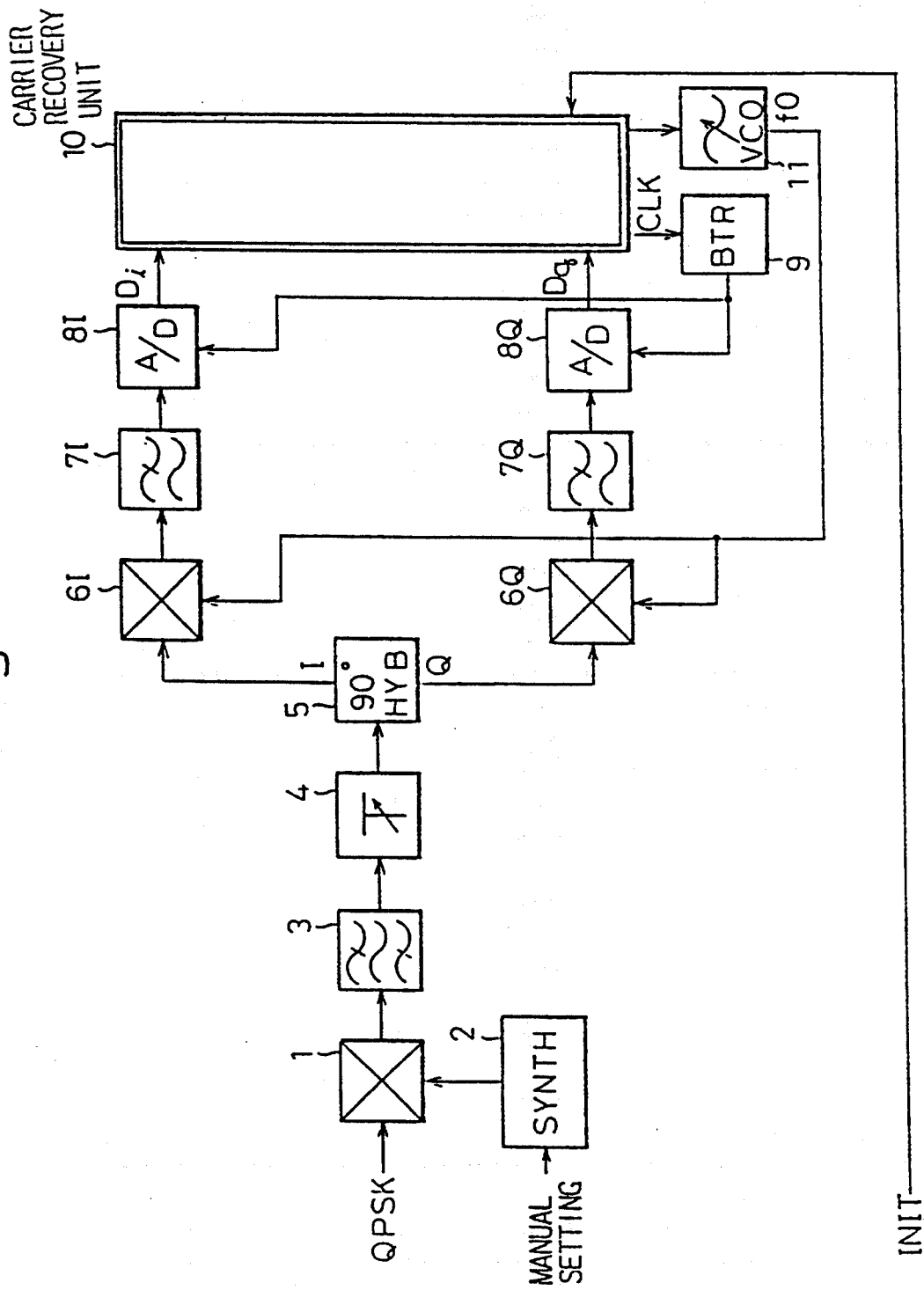
FIG. 2 is a view of the general constitution of a demodulating apparatus.

FIG. 2 is a view of the general constitution of a demodulating apparatus which is provided in each of the ground stations A, B, and C. For example, the demodulating apparatus of the ground station A receives an input signal QPSK of a quadrature PSK wave etc. from the ground station C and reduces it to a second local signal by a frequency converter 1 by the frequency from a synthesizer 2. Further, it extracts only the channel needed by itself by a band-pass filter and applies it through a variable attenuator 4 to a 90° hybrid 5. Here, the in-phase signal (I) and quadrature signal (Q) are split and the reproduced carrier from an oscillator 11 for generating a reproduced carrier (usually comprised of a voltage controlled oscillator (VCO)) is used for synchronous detection by the mixers 6I and 6Q. Further, this is passed through low-pass filters 7I and 7Q and input to the analog/digital convertors (A/D) 8I and 8Q to obtain the reproduced data Di and Dq. During this analog/digital conversion, use is made of a timing signal from a bit timing recovery circuit (BTR). Note that in the figure, CLK is a reproduced clock which serves as the time standard during generation of the timing signal.

In the above construction, the reproduced carrier is made to be completely synchronized in phase with the input signal QPSK. Therefore, a carrier recovery unit 10 is provided. This controls the oscillator 11 so that the phase deviation between the two becomes minimum at all times.

Note that the above-mentioned construction serves as the basis of a demodulating apparatus and that the construction itself is common to all types of demodulating apparatuses. However, various proposals have been made on the construction of the inside of a carrier recovery unit 10.

Figure 3:
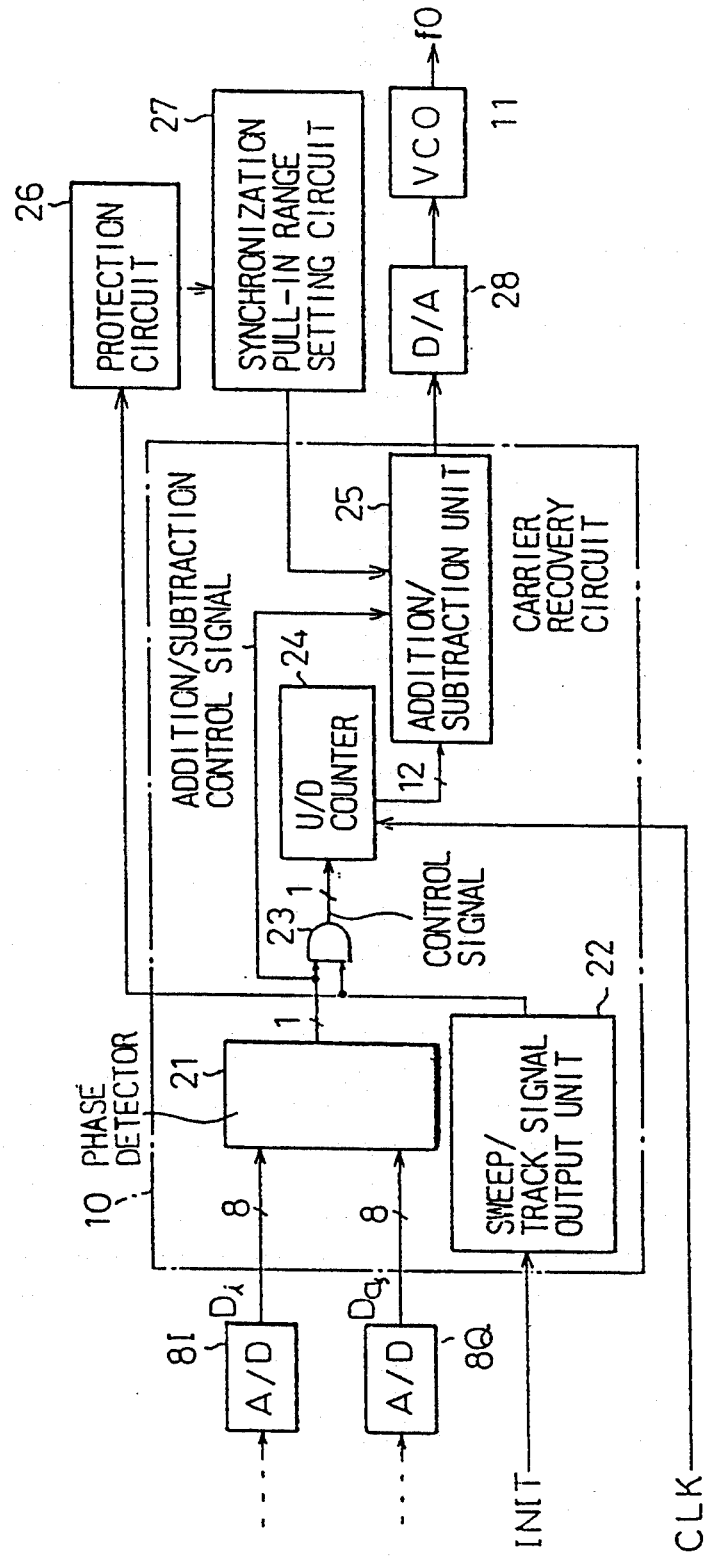
FIG. 3 is a view of a detailed example of a known carrier recovery unit forming an assumption of the present invention.

FIG. 3 is a view of a detailed example of a known carrier recovery unit 10 forming an assumption of the present invention. This is comprised of an up/down counter and an addition/subtraction unit. The carrier recovery unit 10 is mainly comprised of a phase detector which receives as input the reproduced data Di and Dq obtained by synchronously detecting the input signals QPSK by the recovered carrier (f0) and outputs as a phase detection signal a binary signal corresponding to the lead or lag of the phase between the input signal QPSK and the recovered carrier (f0), an up/down counter (U/D counter) 24 which performs an up-count or down-count on the clock CLK in accordance with the phase detection signal, an addition/subtraction unit 25 which adds or subtracts a band value corresponding to the predetermined synchronization pull-in range obtained from the synchronization pull-in range setting circuit 27 to or from the count output of the up/down counter 24 and uses the result as the control input for the oscillator (VCO) 11 generating the reproduced carrier (f0), and a sweep/track signal output unit 22 which receives as input the recovered carrier synchronization detection signal INIT obtained from a phase indeterminacy elimination circuit (not shown), showing if the phase of the recovered carrier (f0) is at the optimum phase for reading the recovered data, and outputs a track signal for causing the oscillator 11 to operate in the phase-locked loop mode or a sweep signal for causing it to perform an automatic sweep in accordance with whether the phase is at the optimum phase.

Note that reference numeral 26 is a protection circuit which performs the function of front protection and rear protection, while 28 is a digital/analog converter (D/A) for applying an analog control input to the analog VCO 11. Further, reference numeral 23 is an AND gate which closes when the sweep signal is used and opens when the track signal is used. Further, the synchronization pull-in range setting circuit 27 sets the band value to be small so as to lessen the effect of noise in the track mode where a track signal is output to make the oscillator 11 operate in a phase-locked loop mode (where the phase of the recovered carrier is made to follow the phase of the input carrier) and sets the band value to be larger to shorten the time required for synchronization pull-in in the sweep mode where a sweep signal is output for making it perform an automatic sweep.

Taking the explanation of FIG. 1 as an example, as mentioned earlier, assume a first ground station A suspends communication with a second ground station B so as to start communication with a third ground station C. At this time, the first ground station A temporarily enters a non-input signal state. When this happens, the up/down counter 24 shown in FIG. 3 in the first ground station A receives a sweep signal from the sweep/track signal output unit 22 and immediately enters an up-count (or down-count) operation in one direction. That is, it enters the sweep mode. In this case, if the input signal from the third ground station C next starting the communication is received directly after the above-mentioned input signal is disconnected, there is a chance that the track mode can be returned to once again, but when the input signal is received a while after the input signal is disconnected, the sweep in the sweep mode is considerably advanced and the signal is out of the synchronization pull-in range of the track mode. This being the case, since the pull-in of synchronization is started under the sweep mode anew, at the maximum, one cycle of the sweep passes (that is, the up/down counter 24 ends one cycle's worth of the count in one direction). During that time, communication between the first ground station A and the third ground station C cannot be started until synchronization is established.

In the end, as mentioned earlier, there is the problem that several seconds are taken at each ground station after the input signal from a certain other ground station is disconnected until the input signal from still another ground station can start to be normally received. The time of these several seconds itself is short, but a blank of several seconds occurring in the middle of for example communication for a television conference would prolong the conference and significantly reduce the quality of the communication service.

The construction of the present invention allowing this problem to be solved will be discussed in detail below.

Figure 4:
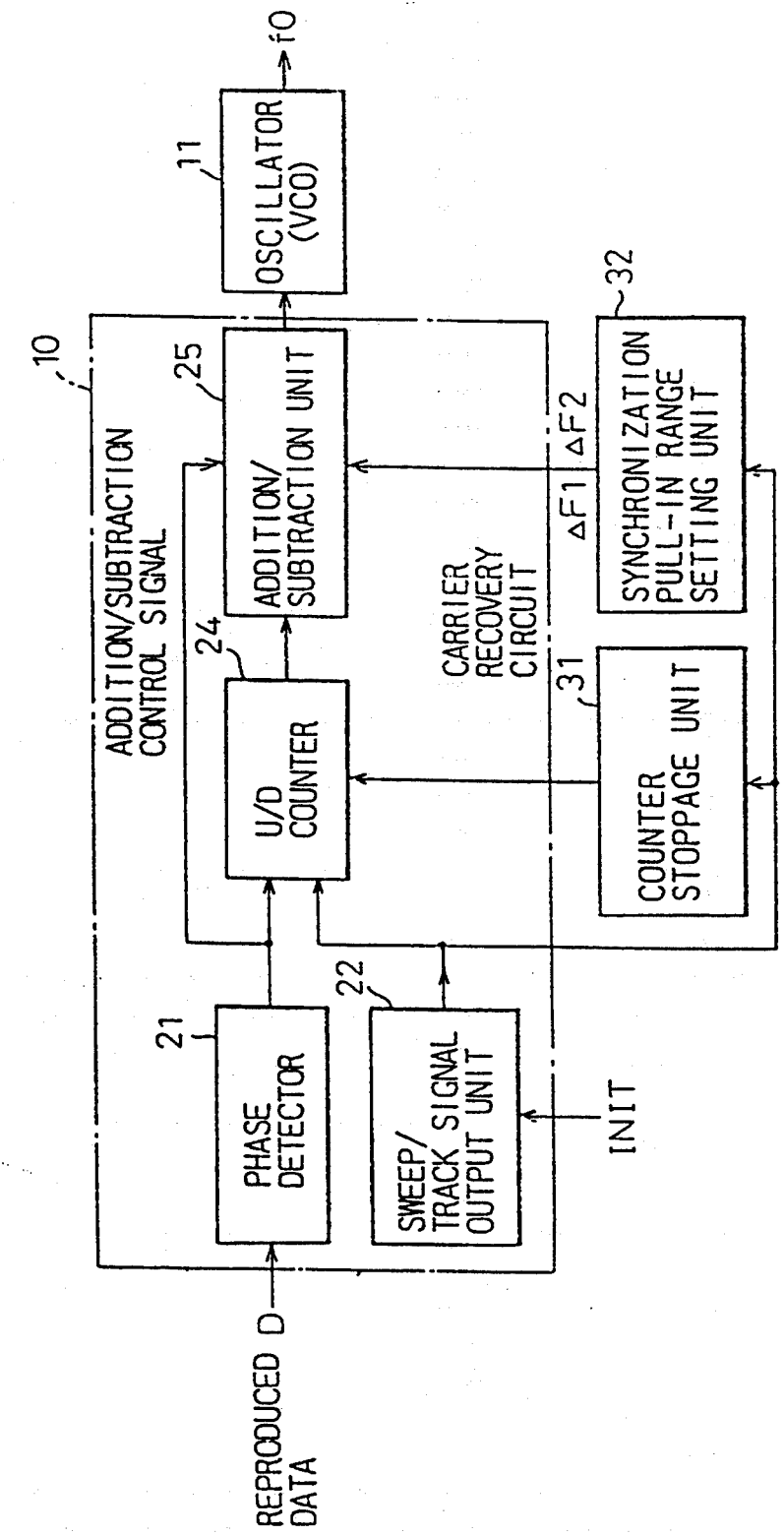
FIG. 4 is a view of the basic constitution of the present invention.

FIG. 4 is a view of the basic constitution of the present invention. In the figure, the construction (21, 22, 24, and 25) inside the carrier recovery unit 10 is basically no different from the conventional construction shown in FIG. 3. Further, the oscillator (VCO) 11 for generating the recovered carrier (f0) is no different from the past.

The characterizing constituent elements of the present invention are the counter stoppage unit 31 and the synchronization pull-in range setting unit 32. The counter stoppage unit 31 functions to stops the operation of the up/down counter 24 and freeze the count output of the same immediately when the signal from the sweep/track signal output unit 22 changes from the track signal to sweep signal. Further, the synchronization pull-in range setting unit 32 functions to generate a broad band value ($\Delta F2$) as the band value substantially simultaneously with when the operation of the up/down counter 24 is made to stop and generate a narrow band value ($\Delta F1$; $\Delta F2 > \Delta F1$) as the band value when the signal from the sweep/track signal output unit 22 changes from the sweep signal to the track signal.

Figure 5:
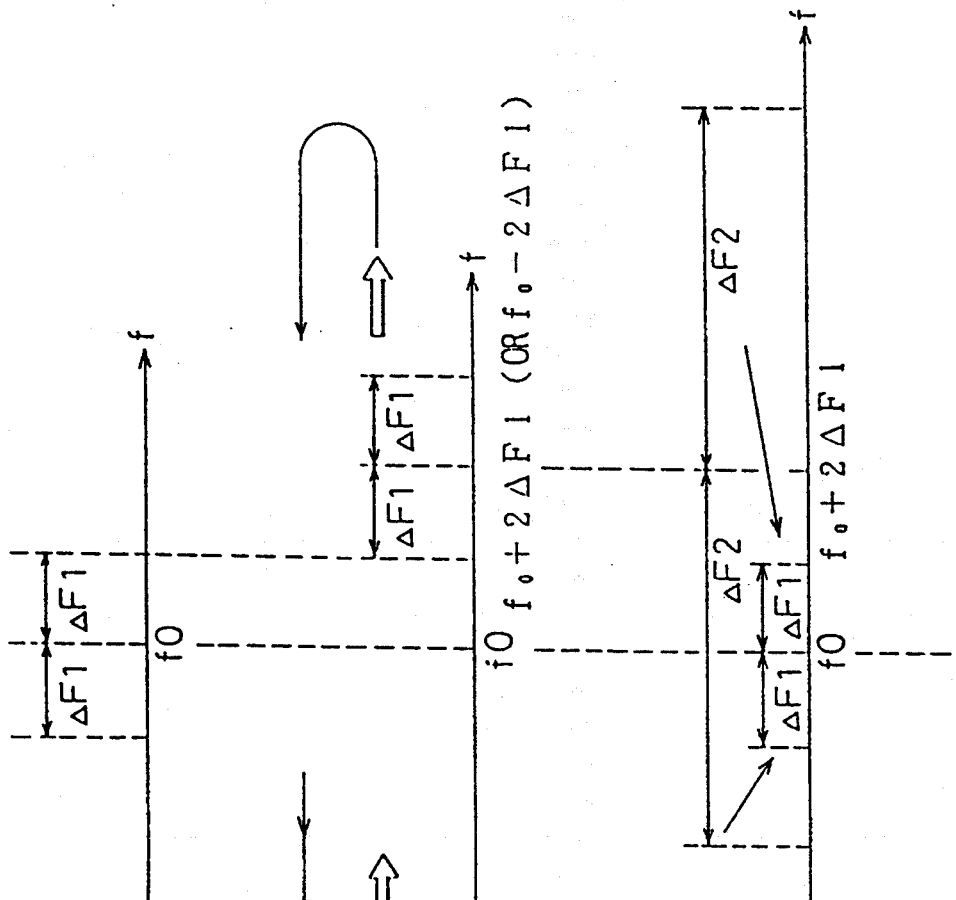
FIGS. 5A, 5B, and 5C are views for explaining the principle of operation of the present invention.

FIGS. 5A, 5B, and 5C are views for explaining the principle of operation of the present invention. FIG. 5A shows the pull-in synchronization range ($-\Delta F1$, $+\Delta F1$) in the track mode. That is, the output frequency of the oscillator (VCO) 11 at this time covers a range of $f0 \pm \Delta F1$ about the frequency f0 of the recovered carrier and faithfully follows the frequency of the carrier of the input signal in that range.

However, if the previously mentioned disconnection of the input signal occurs, the carrier recovery unit 10 loses the carrier to be followed and the frequency of the reproduced carrier starts to shift. In the explanation of FIGS. 5A to 5C, it is assumed that it shifts to the high frequency side (however, the same applies to when it shifts to the low frequency side). When the frequency of the recovered carrier shifts and the low frequency end ($f0 - \Delta F1$) of the synchronization pull-in range exceeds the high frequency end ($f0 + \Delta F1$) of the synchronization pull-in range, the sweep mode is entered. The state just before the sweep mode is entered is shown in FIG. 5B. After the sweep mode is entered, the output frequency of the oscillator 11 returns to its original level after sweeping in one direction as shown by the bold arrow in the figure. During this time, the synchronization is established.

However, a one-directional sweep takes several seconds to complete one cycle and therefore the above-mentioned problem occurs. Therefore, in the present invention, the counter stoppage unit 31 is used to stop the operation of the up/down counter 24 immediately after the input signal has been disconnected. Note that in the conventional demodulating apparatus of FIG. 3, the sweep mode of FIG. 5B was immediately entered after the input signal was disconnected.

By making the operation of the up/down counter 24 stop immediately along with the disconnection of the input signal, the count output (f0) is frozen within $2 \times \Delta F1$ of FIG. 5A and the frequency shift of the recovered carrier is stopped. It is not known at which frequency of FIG. 5A this frequency shift stops, but at the worst it will stop at the high frequency end ($f0 + \Delta F1$). If falling out of this for some reason, the effect of the present invention will merely not be obtained and it will take several seconds for establishment of synchronization by the usual sweep mode.

In the present invention, at the same time as immediately stopping the operation of the up/down counter 24 along with the disconnection of the input signal, the synchronization pull-in range is expanded to $\Delta F2$ by the synchronization pull-in range setting unit 32. By this, it is possible to wait for the input signal to be received next in the track mode. Accordingly, synchronization pull-in of the input signal to be received next can be completed at a high speed without interposition of a sweep mode with its attendant several second delay. This state is shown in FIG. 5C. As mentioned above, after the disconnection of the input signal, the output frequency of the oscillator 11 is just before the sweep mode shown in FIG. 5B at the worst. FIG. 5C shows the synchronization pull-in range expanded under these worst conditions.

In a track mode with an expanded synchronization pull-in range, when the pull-in of phase synchronization for the new input signal is started, the output from the sweep/track signal output unit 22 changes from the sweep signal to the track signal. Responding to this change, the synchronization pull-in range setting unit 32 returns the expanded synchronization pull-in range $\Delta F2$ to the narrow synchronization pull-in range $\Delta F1$ in the usual track mode to try to establish phase synchronization even faster.

As specific numeral examples of the two types of band values given to the addition/subtraction unit 25 by the synchronization pull-in range setting unit 32, that is, the broad band value ($\Delta F2$) and the narrow band value ($\Delta F1$), the broad band value ($\Delta F2$) may be selected to be about 4 times ($4 \times \Delta F1$) the narrow band value ($\Delta F1$). This corresponds to the case of allocation of a synchronization pull-in range in FIG. 5C.

Figure 6:
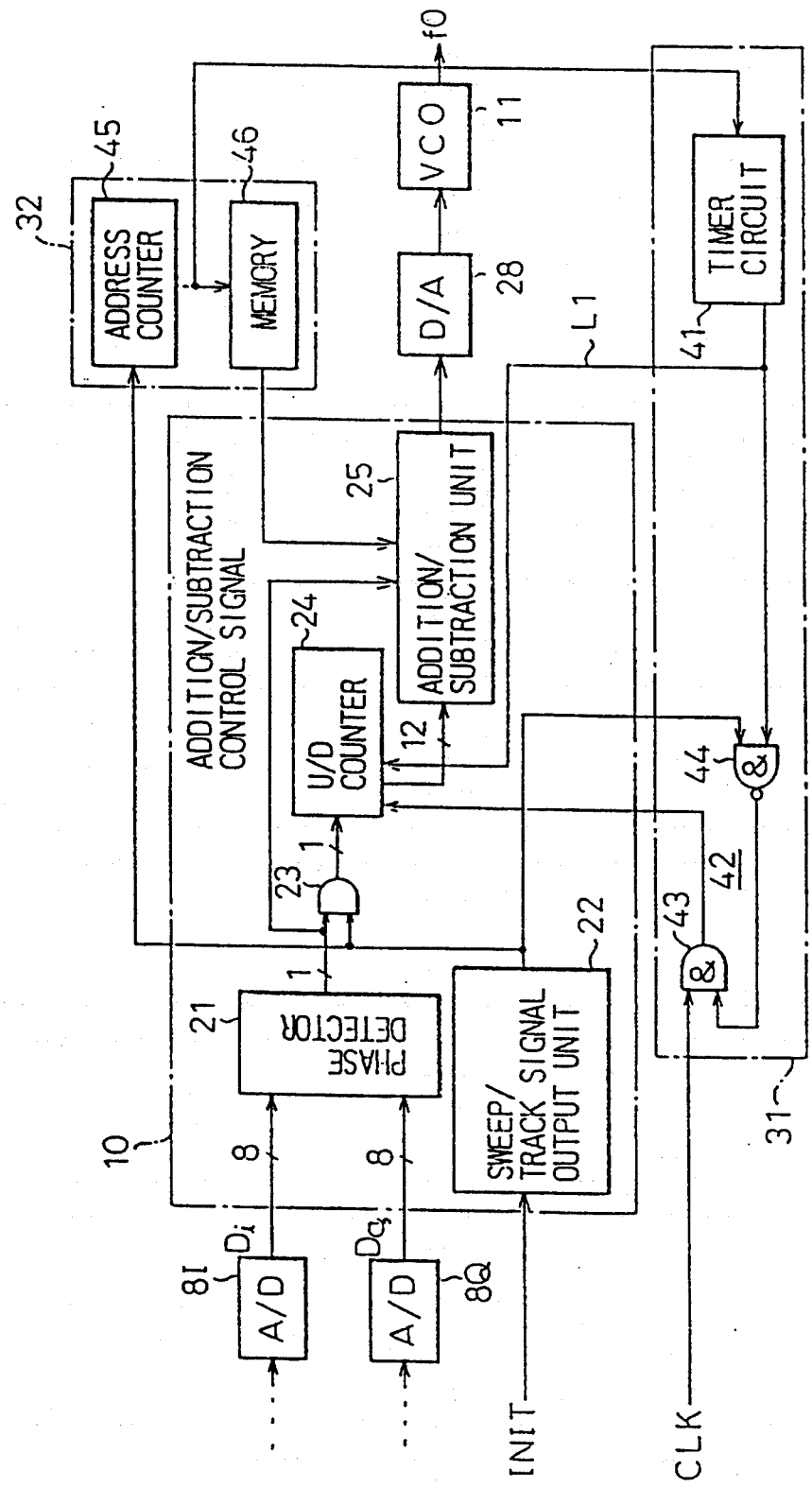
FIG. 6 is a view of an embodiment of the present invention.

FIG. 6 is a view of an embodiment of the present invention. In this figure, the counter stoppage unit 31 shown in FIG. 4 is comprised of a timer circuit 41. Further, it includes a gate circuit 42 which receives as inputs the output of the timer circuit 41 and the output of a sweep/track signal output unit 22. When the output from the sweep/track signal output unit 22 changes from the track signal to the sweep signal due to a disconnection of the input signal, the timer circuit 41 becomes on and closes the first gate circuit (AND gate) 43 through the second gate circuit (NAND gate) 44. By this, the supply of the clock CLK to the up/down counter 24 is stopped. Therefore, the count output of the counter 24 is frozen. Note that the reasons why the timer circuit 41 and the second gate circuit 44 are necessary will be explained later.

In FIG. 6, the synchronization pull-in range setting unit shown in FIG. 4 is comprised of an address counter 45 and a memory 46. The memory 46 gives a band value corresponding to the synchronization pull-in range to the addition/subtraction unit 25. This band value is a narrow band value ($\Delta F1$), a broad band value ($\Delta F2$), or intermediate band values (one or more). The intermediate band values are used as transitory band values for making the synchronization pull-in range converge from $\Delta F2$ to $\Delta F1$ in FIG. 5C.

The above-mentioned band values ($\Delta F1$, $\Delta F2$, and intermediate band values) are stored in the memory (for example, comprised of a ROM) 46 in correspondence with addresses. The access to the memory 46 is performed by these addresses. The address counter 45 cyclically outputs while incrementing one by one the addresses for accessing the memory 46. The address counter 45 is not operative when receiving a track signal from the sweep/track signal output unit 22 and outputs a predetermined single address to the memory 46. That is, a single band value (ΔF1) set for the sweep mode is made to be output from the memory 46. On the other hand, when the signal from the sweep/track signal output unit 22 changes to a sweep signal (when the input signal is disconnected), the address counter 45 starts the count operation and changes the band value from the memory 46 from ΔF2 to ΔF1, When synchronization with the input signal is established and thereby the track signal is output, it stops the count operation.

Figure 7:
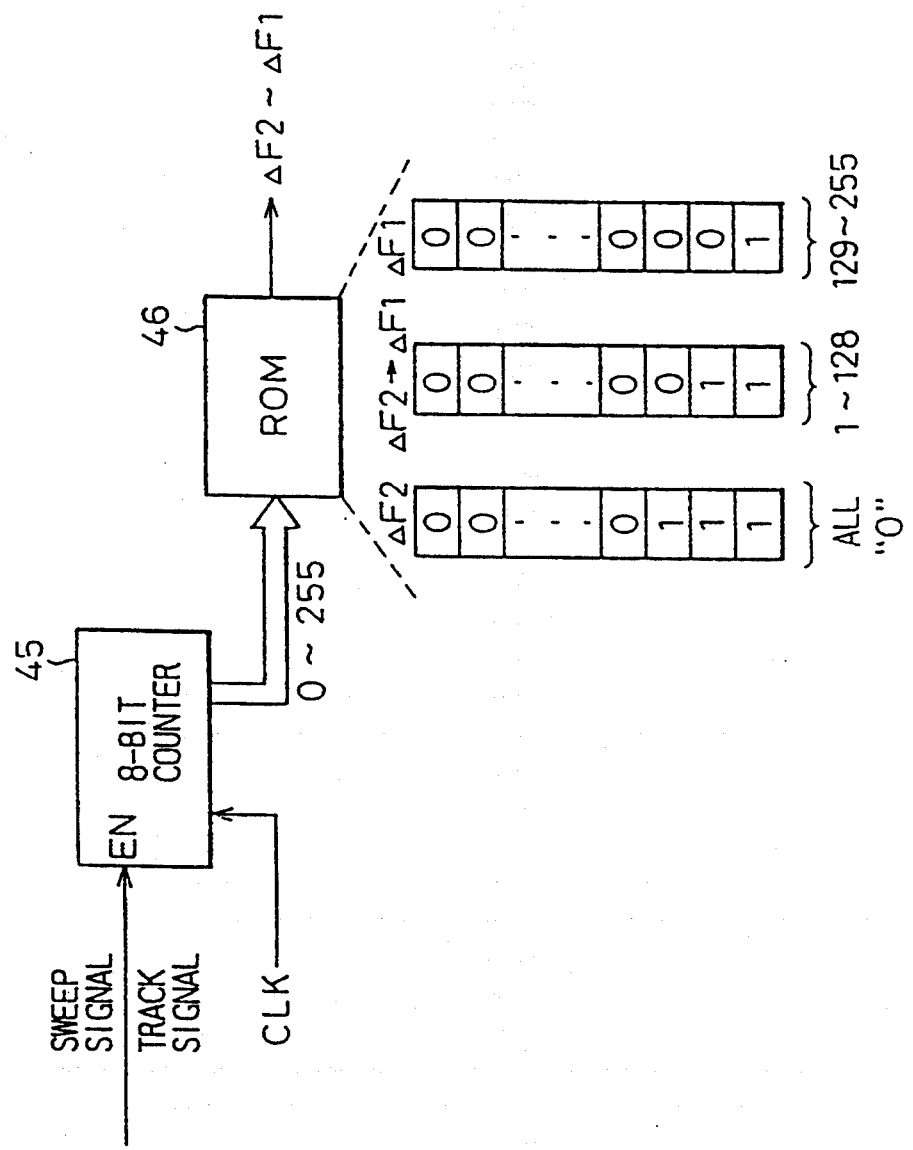
FIG. 7 is a view of a specific example of a synchronization pull-in range setting unit in FIG. 6.

FIG. 7 is a view of a specific example of a synchronization pull-in range setting unit in FIG. 6. The address counter 45 is comprised of an 8-bit counter which receives at its enable terminal EN a signal (sweep signal or track signal) from the sweep/track signal output unit 22. When the sweep signal is received, the 8-bit counter 45 starts the counting of the clock CLK. The count output changes from "0" to "255". When "0", the count output is all "0". If the memory 46 comprised of the ROM is accessed at this all "0", first, a broad band value (ΔF2) is read out. The counter 45 counts up. When the count output is "1" to "128", the intermediate band value is read out, while when the count output is "129" to "255", the narrow band value (ΔF1) is read out.

When the count output becomes all "0", that is, when the input signal is disconnected, this all "0" state is applied to the timer circuit 41 of FIG. 6 as well to turn it on. The timer circuit 41 is for example comprised of a monostable multivibrator and by turning on outputs "H" for a predetermined time. This predetermined time is for limiting the term during which the count output of the up/down counter 24 is frozen. If this predetermined time is for example made 5 seconds, when it is not possible to receive a track signal ("L") from the sweep/track signal output unit 22 for this 5-second period (unsuccessful establishment of synchronization), the output of the timer circuit 41 after the elapse of the 5 seconds is switched to "L" to forcibly make the output of the second gate circuit 44 "H", forcibly open the first gate circuit 43, and start the supply of the clock to the up/down counter 24. The normal sweep mode is entered as a result of this.

However, if a track signal ("L") is produced in that 5-second interval (successful establishment of synchronization), it is necessary to immediately place the counter 24 in the operational state. This is satisfied by the gate circuit 42. That is, if a track signal ("L") is output from the sweep/track signal output unit 22, the output of the second gate circuit (NAND gate) 44 becomes "H" and the first gate circuit (AND gate) 43 is opened to pass the clock CLK.

The output of the timer circuit 41 is also input to the up/down counter 24 through the line L1. The up/down counter 24 is preferably comprised as a variable stage counter. The number of stages of the variable stage counter is made larger while the count output of the counter 24 is frozen (while the timer circuit 41 is on). Right after the input signal is disconnected, the state inside the demodulating apparatus is not stable and noise easily occurs. Therefore, the output from the sweep/track signal output 22 is also not stable. That is, despite the fact that synchronization has not been completely established, a track signal is erroneously produced. If such an erroneous track signal ("L") is produced, it passes through the second gate circuit 44 to open the first gate circuit 43, a clock CLK is applied to the up/down counter 24, and the count output which should be frozen ends up being shifted. If such a shift occurs several times, the signal will fall out of the synchronization pull-in range and it will become difficult to establish synchronization with the input signal in the track mode.

Therefore, while the timer circuit 41 is on, the sensitivity of the up/down counter with respect to such a mistaken track signal is blunted. More specifically, the number of stages of the counter 24 is increased. The up/down counter generally performs the function of an integrator, so making the number of stages of the counter 24 larger is equivalent to making the integration time constant ($\tau$) larger. It is possible to slow the counting speed of the clock CLK supplied due to a mistaken track signal.

Figure 8:
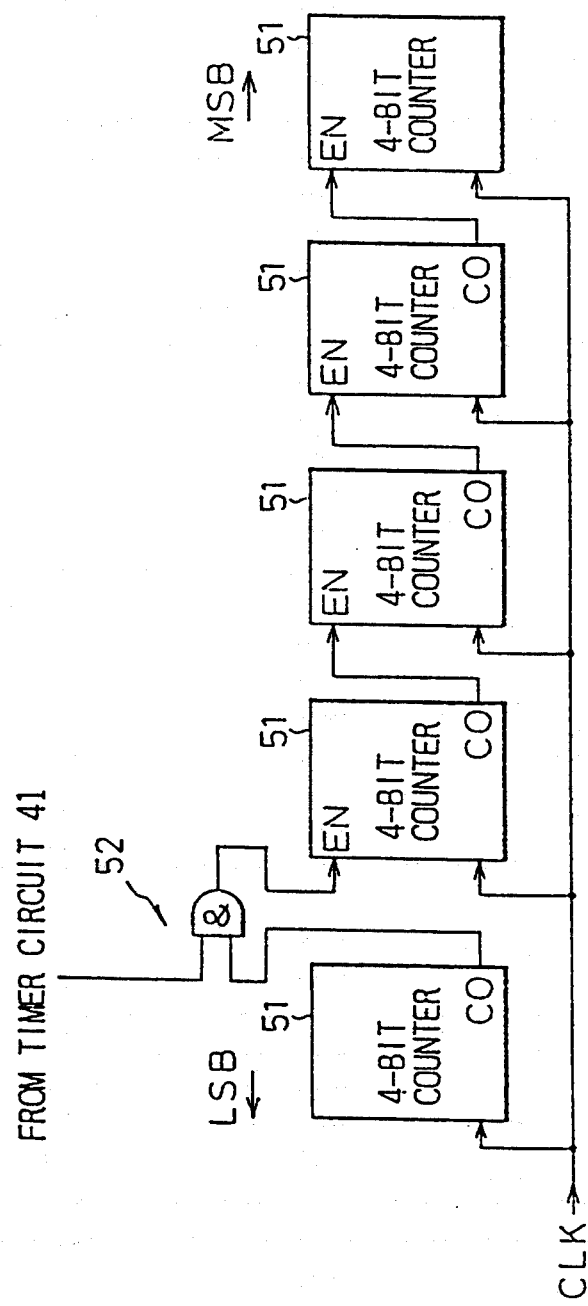
FIG. 8 is a view of an example of the constitution of an up/down counter.

FIG. 8 is a view of an example of the constitution of an up/down counter, by which a variable stage counter may be realized. In the figure, 51 is for example a 4-bit counter, a plurality of which are connected in cascade. Each counter 51 receives in common a clock CLK at a clock terminal and is provided with an enable terminal EN and a carry-out terminal CO.

Between two adjacent counters 51 is provided a selective connection means 52, which can connect or disconnect adjoining counters so as to make the number connected variable. Note that in the figure, only one selective connection means 52 is shown, but a further number may be provided as well. As one example of such a means 52, use may be made of an AND gate. When the timer circuit 41 is on and the output becomes "H", the carry-out terminal CO of the counter 51 on the least significant bit (LSB) side and the enable terminal EN of the counter 51 on the most significant bit (MSB) side adjoining that counter are connected, thereby increasing the total number of counters 51 connected.

Figure 9:
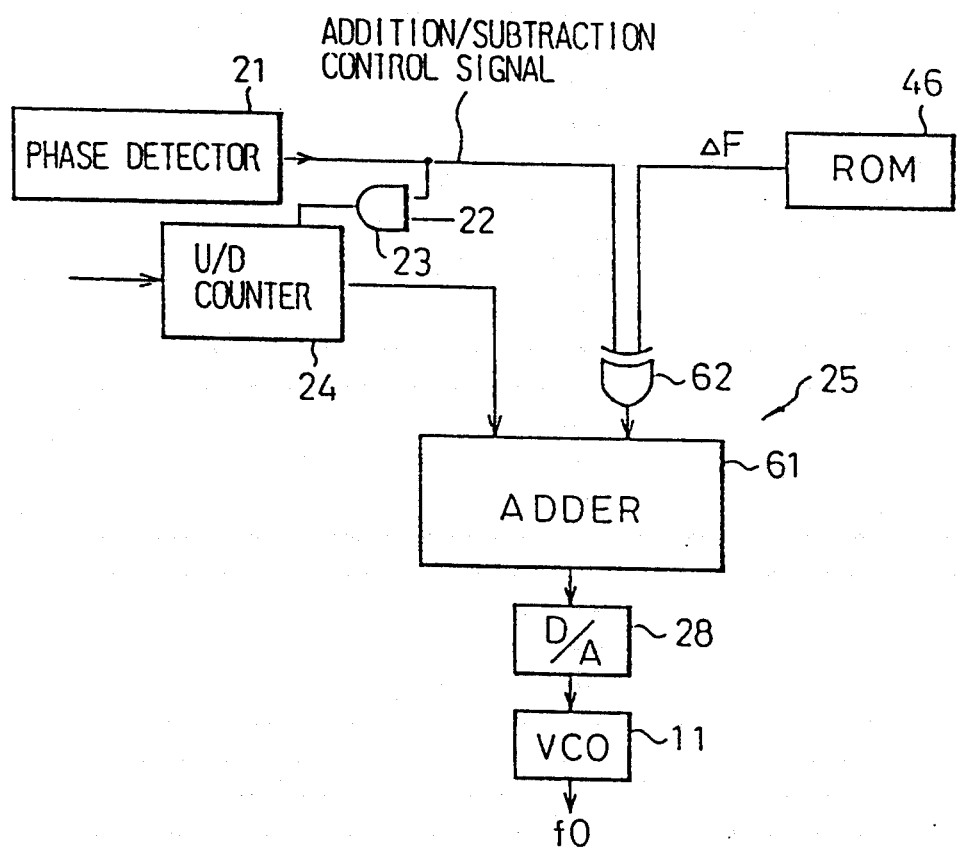
FIG. 9 is a view of an example of an addition/subtraction unit.

FIG. 9 illustrates an example of an addition/subtraction unit. The addition/subtraction unit 25 is comprised of a single adder circuit 61 and an exclusive OR circuit (EOR) 62. The adder circuit 61 has two inputs and the exclusive OR circuit 62 has two inputs. An addition/subtraction control signal from the phase detector 21 is applied to one of the inputs of the EOR 62 and the band value mentioned earlier from the ROM 46, as it is or inverted in polarity, is applied to the other input of the EOR circuit 62. The output of the EOR circuit 62 is applied to one input of the adder circuit 61. The count output from the up/down counter 24 is applied to the other input of the adder circuit 61.

The up/down count control of the up/down counter 24 is performed in accordance with the lead/lag state of the phase detection signal from the phase detector 21. For example, in the lead state, control is performed for counting up and the frequency (f0) of the recovered carrier from the VCO 11 is shifted to the right on the f (frequency) axis of FIGS. 5A to 5C. Further, in the lag state, control is performed for counting down and the recovered carrier from the VCO 11 is shifted to the left on the f axis of the figures.

The count output of the up/down counter 24 shifted to the right or shifted to the left as mentioned above has added to it or subtracted from it the band value (ΔF) from the ROM 46. The absolute value of the band value, as mentioned above, changes among ΔF1, ΔF2, or values between the two. The lead/lag state of the phase detection signal is applied to the EOR 62 as an addition/subtraction control signal ("1" or "2"). The band value (ΔF) from the ROM 46 is applied to the adder circuit 61 as +ΔF (corresponding to the ΔF1 set at the right side from the frequency F0 in FIG. 5A for example) in the lead state and as −ΔF (corresponding to ΔF1 set to the left side from f0 in FIG. 5A) in the lag state.

Figure 10:
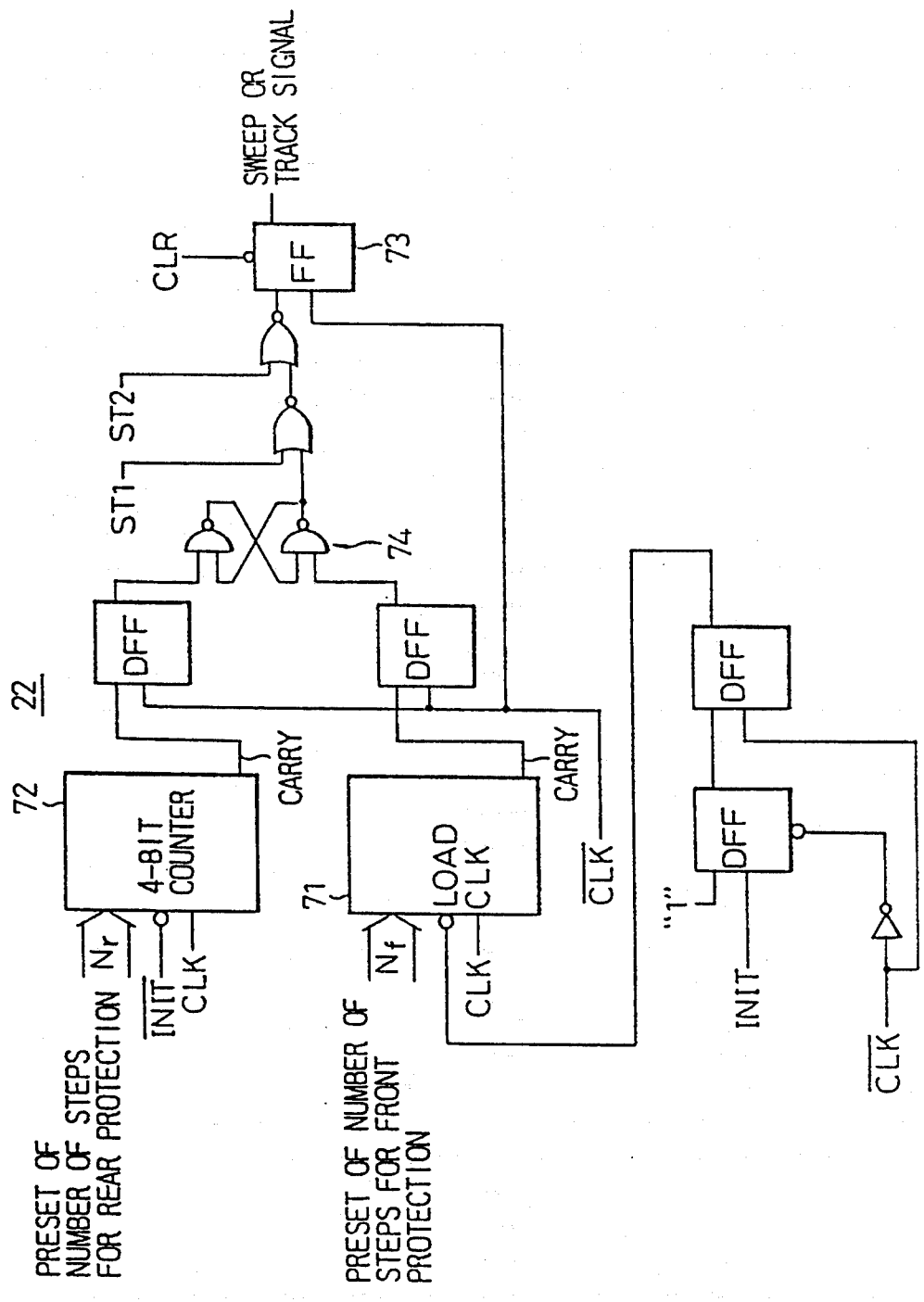
FIG. 10 is a view of a specific example of a sweep/track signal output unit.

FIG. 10 is a view of a specific example of a sweep/track signal output unit. As mentioned earlier, the sweep/track signal detection unit 22 receives as input from the left side of FIG. 10 the recovered carrier synchronization detection signal INIT (output from the phase indeterminacy elimination circuit 83 mentioned later) showing whether or not the phase of the recovered carrier is at the optimum phase for reading the reproduced data. Depending on whether or not the phase is optimum, it outputs from the right side of FIG. 10 a track signal ("L") for causing the VCO 11 to operate by phase locked loop or a sweep signal ("H") for causing it to perform automatic sweep.

The main role of the sweep/track signal output unit 22 is to perform the front protection and rear protection of the signal INIT. The number of stages (Nf) of the front protection is set in the counter 71, while the number of stages (Nr) of the rear protection is set in the counter 72. When the signal INIT (which is "H" when the phase is not optimum, as mentioned earlier) is not detected consecutively Nr number of times (when it is assumed that the optimum phase has been settled at), a carrier is output from the counter 72, a logic "L" (track signal) is output from the latch circuit 73, and the track mode is entered. Conversely, when the signal INIT is detected consecutively more than Nr number of times, it is recognized that the signal is out of synchronization.

On the other hand, when the signal INIT is detected consecutively Nf number of times (when it becomes fairly certain that the phase is not optimum), a carrier is output from the counter 71, the logic "H" (sweep signal) is output from the latch circuit 73, and the sweep mode is entered.

DFF in FIG. 10 is a D-flip-flop, which is a timing adjusting circuit for causing synchronization of various signals with a clock. Further, the flip-flop 74 is set by the carrier from the counter 72 (rear protection), while is reset by the carrier from the counter 71 (front protection). The two NOR gates receive as input the one-bit external set point values ST1 and ST2 and are made to enter the sweep mode or the track mode, when necessary, manually.

The present invention, as explained above, makes possible high speed establishment of synchronization by freezing the count output of the up/down counter as soon as disconnection of the input signal is detected and by expanding the synchronization pull-in range (ΔF) to ΔF2 and thereby having the synchronization pull-in of the succeeding input signal performed only with phase synchronization. In this case, there is a difference in the effect of the present invention depending on how the disconnection of the input signal is detected. The fact that the disconnection of the input signal has to be quickly detected is an important point in the present invention. If the detection time is long, then the carrier recovery unit 10 ends up entering the sweep mode and the output frequency of the oscillator (VCO) 11 is shifted far to the right from the f0+2ΔF1 on the f axis of FIG. 5C. Even if the synchronization pull-in range is made broader (ΔF2), immediate synchronization pull-in of the new input signal becomes impossible.

The most general method for detection of disconnection of an input signal is the method of monitoring the gain of the automatic gain control (AGC) circuit. Note that an AGC circuit is provided at the input side of the frequency converter 1 shown at the left end of FIG. 2. It is possible to monitor the gain and judge temporarily when it has reached a maximum that a disconnection of the input signal has occurred. In this method using the AGC circuit, the time required for detection of the disconnection of the input signal is preferably made shorter. However, this method cannot be employed in circuits including much noise. This is because the gain reaches the maximum value even due to noise, so there is the defect that it becomes difficult to detect the disconnection of an input signal reliably.

Therefore, in the present invention, as a method for detection of disconnection of an input signal which both lacks the above defect and involves a relatively short detection time, use is made of a phase indeterminacy elimination circuit. Such a phase indeterminacy elimination circuit itself is already known. The signal output from this circuit is used for detection of the disconnection of an input signal. This signal is the above-mentioned carrier synchronization detection signal INIT.

Figure 11:
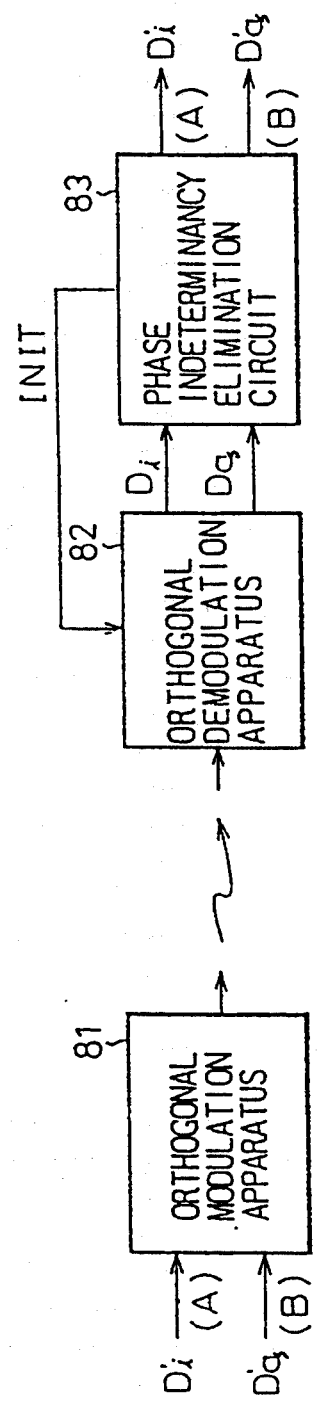
FIG. 11 is a view showing an outline of a phase indeterminacy elimination circuit.

FIG. 11 is a view showing an outline of a phase indeterminacy elimination circuit, while FIGS. 12A, 12B to 12H are views showing the modes of phase indeterminacy. Referring to FIG. 11, block 81 is a transmitter side orthogonal modulation apparatus, from which apparatus 81 is transmitted by radio waves the original data Di' and Dq'. These are received by the receiver side orthogonal demodulation apparatus 82 to which the present invention is applied, thereby obtaining the previously mentioned reproduced data Di and Dq. However, the reproduced data Di and Dq are not guaranteed to match the original data Di' and Dq'. This is because the phase of the recovered carrier does not necessarily match the phase of the received data (Di' and Dq'). Therefore, the phase of the recovered carrier is determined through the phase indeterminacy elimination circuit 83 to reproduce the original data Di' and Dq'. The indeterminacy or determinacy of the phase is output from the circuit 82 as the "H" or "L" state of the above-mentioned recovered carrier synchronization detection signal INIT.

Referring to FIGS. 12A to 12H, FIGS. 12A and 12B show the case of determination of the phase of the recovered carrier. That is, Di becomes Di' as it is, while Dq becomes Dq' as it is.

However, if the phase of the recovered carrier deviates 90°, 180°, or 270° from the optimum phase, as shown by FIGS. 12C to 12H, then it is necessary to exchange the data shown schematically in 91, 92, and 93 of the figures. For example, in the data exchange 91, Di is made Dq' and the inversion of Dq is made Di'. Similarly, at the other data exchanges 92 and 93, the data is processed as illustrated respectively.

Note that the principle of the construction of the phase indeterminacy elimination circuit is known. For example, in a system handling burst signals such as in satellite communication, the indeterminacy is eliminated by the detected polarity of a unique word at the header part of each received burst. Further, in general voice transmission, a 32-bit known code (SOM) is added for each 224 bits of PCM voice. This SOM is used to establish frame synchronization and the received SOM pattern is investigated to eliminate the phase indeterminacy of the recovered carrier. On the other hand, in general data transmission, such a SOM is not added, so the frame synchronization and the elimination of the indeterminacy of the recovered carrier phase are performed using a syndrome obtained during error correction decoding. That is, the phase of the recovered carrier is corrected so that the rate of generation of bit error detected by a syndrome counter falls below a certain value.

Figure 13:
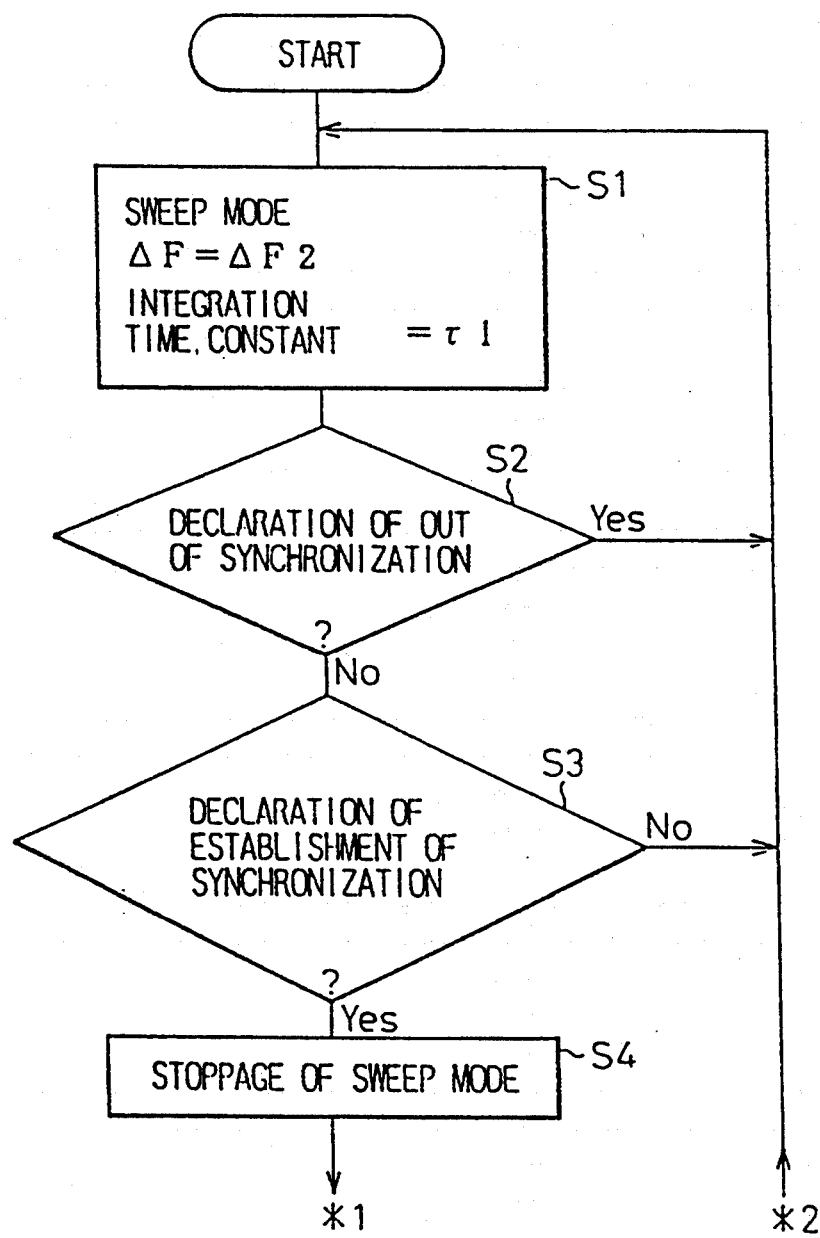
FIG. 13 is a flow chart (part 1) showing the operation of the embodiment (FIG. 6) of the present invention.
Figure 14:
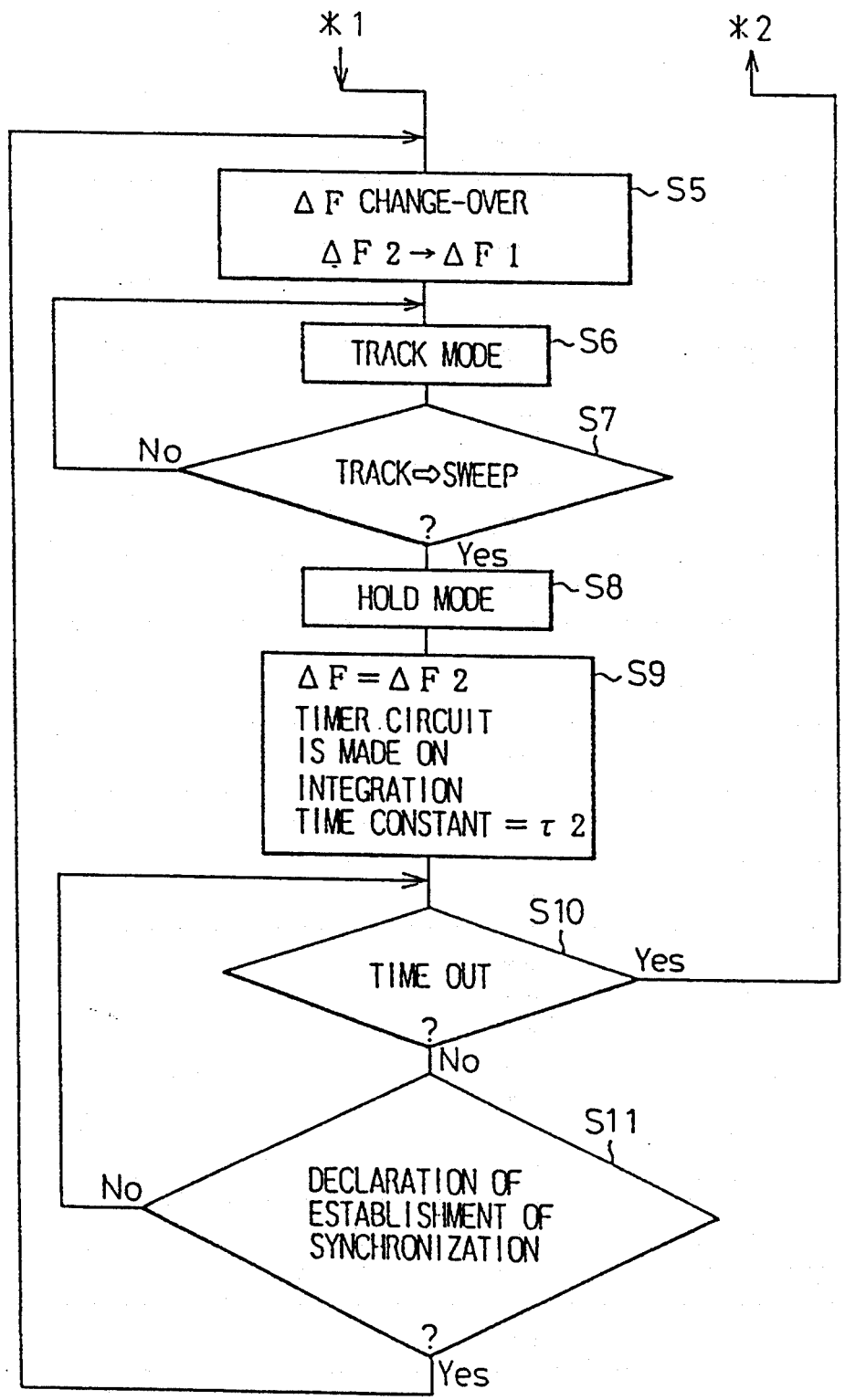
FIG. 14 is a flow chart (part 2) showing the operation of the embodiment (FIG. 6) of the present invention.

FIG. 13 is a part 1 of a flow chart showing the operation of the embodiment (FIG. 6) of the present invention, and FIG. 14 is part 2. First, an explanation will be made of the part of the flow chart of FIG. 13.

At step 1 (S1), the input signal from the transmitter side is received. First, the apparatus enters a sweep mode to establish synchronization between the input signal and the recovered carrier. The synchronization pull-in range ($\Delta F$) at this time is made broader. This is to shorten the time for one cycle of the sweep. In the present invention, as the range ($\Delta F0$), a broad range $\Delta F2$ shown in FIG. 5C is set. Further, the integration time constant $\tau$ (corresponding to the number of stages of the counter 51 shown in FIG. 8) of the up/down counter 24 is selected to be small, that is, $\tau = \tau 1$.

At step 2 (S2), it is investigated if there is a declaration of "out of synchronization" (corresponding to the instability of the bit timing recovery unit (BTR) of FIG. 2). When there is no longer a declaration of "out of synchronization", the routine proceeds to the next step.

At step 3 (S3), it is investigated if there is a declaration of "establishment of synchronization". The presence of such a declaration of "establishment of synchronization" allows determination as to if the recovered carrier synchronization detection signal INIT is "L" or "H". If synchronization is established, the routine moves to the next step.

At step 4 (S4), when the synchronization signal disappears, the sweep mode is stopped.

Referring now to FIG. 14, at step 5 (S5), at the same time as the sweep mode stops, the synchronization pull-in range ($\Delta F$) is changed to become a narrow band value. As this narrow band value, the above-mentioned $\Delta F1$ is set.

At step 6 (S6), the track mode is entered (see FIG. 5A).

At step 7 (S7), the changes in the output of the sweep/track signal output unit 22 are monitored. The steps from step S7 on are the operation relating to the gist of the present invention. Among them, step 7 is the step for detection of the disconnection of the input signal mentioned earlier. More specifically, it is detected if the output from the sweep/track signal output unit 22 has changed from a track signal to a sweep signal.

At step 8 (S8), when it is detected that the signal has changed from a track signal to a sweep signal (disconnection of input signal), the hold mode is immediately entered. The "hold mode" is the mode for freezing the count output of the up/down counter 24.

Step 9 (S9) occurs substantially simultaneously with the above step 8, but in this flow chart is shown separately for ease of understanding.

At step 9, the synchronization pull-in range ($\Delta F$) is made broader ($\Delta F = \Delta F2$) and the high speed synchronization pull-in of the next input signal is started. This is shown in FIG. 5C. Further, the timer circuit 41 (FIG. 6) is turned on. Also, by the on state of the timer circuit 41, the integration time constant $\tau$ of the up/down counter 24 is selected to be large. That is, $\tau = \tau 2$ ($\tau 2 > \tau 1$) to blunt the sensitivity of the up/down counter 24 (mentioned previously). This corresponds to increase the number of stages of the counter 51 shown in FIG. 8.

At step 10 (S10), it is investigated if the timer circuit 41 has run out of time (5 seconds have elapsed in the previous example). If time has run out, the routine returns to step 1 (S1) and the normal sweep mode is started. In this case, the advantage of the present invention cannot be obtained.

At step 11 (S11), it is checked if a declaration of "establishment of synchronization" (signal INIT changes from "H" to "L") has been output before the timer circuit 41 runs out of time.

If a declaration of "establishment of synchronization" has been output, the routine returns to step 5 (S5), where the synchronization pull-in range $\Delta F$ is narrowed to $\Delta F1$ and the track mode (normal communication mode) is entered. In this case, as shown in FIG. 5C and FIG. 7, during the shift from $\Delta F2$ to $\Delta F1$, the intermediate band between the two (see $\Delta F2 \rightarrow \Delta F1$ in FIG. 7) is preferably made to intervene so as to smooth and speed the shift from $\Delta F2$ to $\Delta F1$.

The process from the step 1 (S1) of FIG. 13 to the step 6 (S6) of FIG. 14 normally requires 3 to 4 seconds. During this time, communication is cut off, which causes deterioration of the quality of service during communication for television conferences, for example. According to the present invention, however, the route of step 8→step 9→step 10→step 11→step 5→step 6 of FIG. 14 is passed through from the disconnection of the input signal to the establishment of synchronization with the next signal, so it is possible to eliminate the time consuming sweep mode (see step 1 (S1)).

As explained above, according to the above invention, the sweep mode is not allowed to intervene at all during the time after an input signal is disconnected to when the synchronization for the next input signal is established. As a result, the sweep mode, which normally requires 3 or 4 seconds, is eliminated and it is possible to return to normal communication in about 1 second. For example, a 3 to 4 second blank was felt as considerably long in television conferences etc., but a blank of about 1 second is not felt as such a blank by the viewers and therefore a natural flow of the conference can be secured and there is no deterioration in the quality of the communication service.

I claim:

1. A demodulating apparatus having a phase detector which receives as input reproduced data obtained by synchronously detecting an input signal by a recovered carrier and outputs as a phase detection signal a binary signal corresponding to a lead or lag of phase between the input signal and the recovered carrier, an up/down counter which performs an up-count or down-count on the clock in accordance with the phase detection signal, an addition/subtraction unit which adds or subtracts a band value corresponding to a predetermined synchronization pull-in range to or from the count output of the up/down counter and uses the result as a control input for an oscillator generating the reproduced carrier, and a sweep/track signal output unit which receives as input a recovered carrier synchronization detection signal showing if the phase of the recovered carrier is at the optimum phase for reading the recovered data and outputs a track signal for causing the oscillator to operate in a phase-locked loop mode or a sweep signal for causing it to perform an automatic sweep in accordance with whether the phase is at the optimum phase, said demodulating apparatus characterized in that it is provided with a counter stoppage unit which stops the operation of the up/down counter and freezes the count output of the same immediately when the signal from the sweep/track signal output unit changes from the track signal to the sweep signal and a synchronization pull-in range setting unit which produces a broad band value ($\Delta F2$) as said band value substantially simultaneously with the stopping of the operation of the up/down counter and produces a narrow band value ($\Delta F1$) as said band value when the signal from the sweep/track signal output unit changes from a sweep signal to a track signal.

2. A demodulating apparatus as set forth in claim 1, wherein the up/down counter is made a variable stage counter and the number of stages of the counter is made larger while the count output is frozen.

3. A demodulating apparatus as set forth in claim 2, wherein said counter stoppage unit includes a timer circuit, said timer circuit limiting the period of freezing of said count output to a predetermined period and starting the automatic sweep when that predetermined period has elapsed.

4. A demodulating apparatus as set forth in claim 3, wherein said counter stoppage unit includes a gate circuit which receives as control inputs the output of said timer circuit and the output from said sweep/track signal output unit and wherein said gate circuit shuts off the supply of the clock to the up/down counter for said predetermined period, while starts the supply of the clock to the up/down counter when there is a change from the sweep signal to the track signal.

5. A demodulating apparatus as set forth in claim 4, wherein said broad band value ($\Delta F2$) is set to a value substantially four times ($4 \times \Delta F1$) the narrow band value ($\Delta F1$).

6. A demodulating apparatus as set forth in claim 5, wherein said synchronization pull-in range setting unit is comprised of a memory for storing two values of said broad band value ($\Delta F2$) and said narrow band value ($\Delta F1$) and intermediate band values of the same in correspondence with addresses and an address counter for cyclically outputting while incrementing the addresses one by one, said address counter starting the count operation when receiving said sweep signal and becoming inoperative when receiving said track signal.

7. A demodulating apparatus as set forth in claim 6, wherein said timer circuit turns on the instant the output of the address counter becomes all "0".

8. A demodulating apparatus as set forth in claim 7, wherein the number of stages of the counters is made variable by the output of the timer circuit and the number is made larger when the timer circuit turns on.

9. A demodulating apparatus as set forth in claim 8, wherein the up/down counter is comprised of a plurality of stages of counters which receive a clock in common and which are each provided with an enable terminal and a carry-out terminal and wherein provision is made of a selective connection means connected between a carry-out terminal of a counter on an LSB side and an enable terminal of a counter on an MSB side adjoining that counter, said selective connection means closing the connection between the enable terminal and the carry-out terminal when said timer circuit turns on.

* * * * *